United States Patent
Sohn et al.

(10) Patent No.: US 9,580,786 B2
(45) Date of Patent: Feb. 28, 2017

(54) HIGH MN STEEL SHEET FOR HIGH CORROSION RESISTANCE AND METHOD OF MANUFACTURING GALVANIZING THE STEEL SHEET

(75) Inventors: Il-Ryoung Sohn, Kyungsangbook-do (KR); Kwang-Geun Chin, Kyungsangbook-do (KR); Seong-Ju Kim, Kyungsangbook-do (KR); Myung-Soo Kim, Kyungsangbook-do (KR); Sung-Kyu Kim, Kyungsangbook-do (KR)

(73) Assignee: POSCO, Pohang-si (KR)

( * ) Notice: Subject to any disclaimer, the term of this patent is extended or adjusted under 35 U.S.C. 154(b) by 1858 days.

(21) Appl. No.: 12/097,543

(22) PCT Filed: Dec. 20, 2006

(86) PCT No.: PCT/KR2006/005597
§ 371 (c)(1),
(2), (4) Date: Sep. 4, 2008

(87) PCT Pub. No.: WO2007/074994
PCT Pub. Date: Jul. 5, 2007

(65) Prior Publication Data
US 2009/0053556 A1    Feb. 26, 2009

(30) Foreign Application Priority Data
Dec. 24, 2005  (KR) .................. 10-2005-0129212

(51) Int. Cl.
| | |
|---|---|
| C22C 38/04 | (2006.01) |
| C22C 38/06 | (2006.01) |
| B32B 15/01 | (2006.01) |
| C23C 2/06 | (2006.01) |
| C23C 2/28 | (2006.01) |
| C22C 18/00 | (2006.01) |
| C22C 38/60 | (2006.01) |
| C21D 6/00 | (2006.01) |
| C21D 8/02 | (2006.01) |

(52) U.S. Cl.
CPC .............. *C23C 2/06* (2013.01); *B32B 15/012* (2013.01); *C21D 6/005* (2013.01); *C21D 8/0236* (2013.01); *C21D 8/0273* (2013.01); *C21D 8/0284* (2013.01); *C22C 18/00* (2013.01); *C22C 38/04* (2013.01); *C22C 38/60* (2013.01); *C23C 2/28* (2013.01); *Y10T 428/12799* (2015.01)

(58) Field of Classification Search
None
See application file for complete search history.

(56) References Cited

U.S. PATENT DOCUMENTS

| | | | |
|---|---|---|---|
| 5,200,276 A * | 4/1993 | Tasaki et al. ................. | 428/629 |
| 5,265,919 A | 11/1993 | Takemoto et al. | |
| 5,431,753 A | 7/1995 | Kim et al. | |
| 5,647,922 A * | 7/1997 | Kim et al. .................... | 148/620 |
| 6,358,338 B1 * | 3/2002 | Guelton et al. ............... | 148/547 |
| 6,387,192 B1 | 5/2002 | Frommeyer et al. | |
| 6,911,268 B2 | 6/2005 | Takada et al. | |
| 2003/0145911 A1 | 8/2003 | Hoffmann et al. | |
| 2008/0008901 A1 | 1/2008 | Sugiura et al. | |
| 2008/0271823 A1 | 11/2008 | Hofmann et al. | |
| 2009/0165897 A1 | 7/2009 | McEwan | |

FOREIGN PATENT DOCUMENTS

| | | | |
|---|---|---|---|
| EP | 0480033 A1 | 4/1992 | |
| EP | 1067203 A1 | 1/2001 | |
| EP | 1806421 A1 | 7/2007 | |
| GB | 1589085 A | 5/1981 | |
| JP | 56119722 A | 9/1981 | |
| JP | 4259325 A | 9/1992 | |
| JP | 04297527 A | 10/1992 | |
| JP | 04297563 A | 10/1992 | |
| JP | 5179402 A | 7/1993 | |
| JP | 2002206139 A | 7/2002 | |
| JP | 2004211147 A | 7/2004 | |
| JP | 2005-273001 | * 10/2005 | ............. C22C 38/00 |
| WO | 9313233 A1 | 7/1993 | |
| WO | 9901585 A1 | 1/1999 | |
| WO | 02101109 A1 | 12/2002 | |
| WO | 2006042930 A1 | 4/2006 | |
| WO | 2006082104 A1 | 8/2006 | |
| WO | 2006089832 A1 | 8/2006 | |

OTHER PUBLICATIONS

English translation of Sugiura, JP 2005-273001 (2005).*
Davis et al, Surface Engineering of Carbon and Alloy Steels, 701-740 Handbook Surface Engineering, vol. 5 (1994).*

* cited by examiner

*Primary Examiner* — Yoshitoshi Takeuchi
(74) *Attorney, Agent, or Firm* — The Webb Law Firm

(57) ABSTRACT

A high-manganese hot-dip coated steel sheet is disclosed which provides high corrosion resistance, high ductility and high strength, mainly used for inner and outer panels of automobiles, and a method of manufacturing the same. The high-manganese hot-dip coated steel sheet includes a substrate steel sheet having a composition of (in weight %) 0.1 to 1.5% of C, 5 to 35% of Mn, and the remainder includes Fe and other unavoidable impurities, and a hot-dip zinc coating layer formed on the substrate steel sheet, the hot-dip zinc coating layer having a composition of (in weight %) 0.1 to 10% of Mn, 5 to 15% of Fe, and the remainder including Zn and other unavoidable impurities.

4 Claims, No Drawings

HIGH MN STEEL SHEET FOR HIGH CORROSION RESISTANCE AND METHOD OF MANUFACTURING GALVANIZING THE STEEL SHEET

TECHNICAL FIELD

The present invention relates to a high-manganese hot-dip coated steel sheet mainly used for automobiles and a method of manufacturing the same, and, more particularly, to a high-manganese hot-dip coated steel sheet exhibiting high corrosion resistance and high workability as well as high ductility and high strength and a method of manufacturing the same.

BACKGROUND ART

Recently, regulation has been deepened on waste gas in automobiles due to the exhaustion of fossil fuels and environmental-related problems. As a result, the reduction of weight in automobile bodies to increase automobile fuel efficiency has come to the fore.

Various kinds of high-strength steel sheets have been developed to accomplish the reduction in weight of automobile bodies. As the strength of the steel sheets increases, however, the steel sheets exhibit low ductility. As a result, the use of the steel sheets to be formed as automobile parts is limited.

Much research has been carried out to epochally solve the reduction in ductility of the high-strength steel sheets. As a result, technologies have been proposed for adding 7 to 35 weight % of Mn to a steel, such that the twin deformation of the steel is maintained when the steel is plastically deformed, thereby considerably improving the ductility of the steel while maintaining high strength of the steel (WO93/013233, JP1992-259325, WO99/001585, and WO02/101109).

Meanwhile, Mn is an element exhibiting high ionization tendency. For this reason, a steel having a high Mn content corrodes more rapidly than general steels.

In order that a steel having a high Mn content may be applied to automobiles, therefore, it is necessary to treat the steel such that the steel has high corrosion resistance.

However, development has not taken place on an optimum coating layer and a hot-dip coating process for providing a high-manganese steel containing approximately 5 to 35 weight % of Mn with high corrosion resistance.

It is an aspect of the present invention to provide a high-manganese hot-dip coated steel sheet exhibiting high corrosion resistance and high workability as well as high ductility and high strength.

It is another aspect of the present invention to provide a method of hot-dip coating a high-manganese steel sheet to manufacture a high-manganese hot-dip coated steel sheet exhibiting high corrosion resistance and high workability as well as high ductility and high strength.

SUMMARY OF THE INVENTION

In accordance with one aspect, the present invention provides a high-manganese hot-dip coated steel sheet exhibiting high corrosion resistance, comprising: a substrate steel sheet having a composition of (in weight %) 0.1 to 1.5% of C, 5 to 35% of Mn, and the remainder including Fe and other unavoidable impurities; and a hot-dip zinc coating layer formed on the substrate steel sheet, the hot-dip zinc coating layer containing only Zn, or an alloying hot-dip coating layer formed on the substrate steel sheet, the alloying hot-dip coating layer having a composition of (in weight %) 0.1 to 10% of Mn, 5 to 15% of Fe, and the remainder including Zn and other unavoidable impurities.

In accordance with another aspect, the present invention provides a method of manufacturing a high-manganese hot-dip coated steel sheet exhibiting high corrosion resistance, comprising: depositing a substrate steel sheet having a composition of (in weight %) 0.1 to 1.5% of C, 5 to 35% of Mn, and the remainder including Fe and other unavoidable impurities in a hot-dip zinc coating bath to form a hot-dip zinc coating layer at a surface of the substrate steel sheet.

In accordance with a further aspect, the present invention provides a method of manufacturing a high-manganese hot-dip coated steel sheet exhibiting high corrosion resistance, comprising: depositing a substrate steel sheet having a composition of (in weight %) 0.1 to 1.5% of C, 5 to 35% of Mn, and the remainder including Fe and other unavoidable impurities in a hot-dip zinc coating bath to form a hot-dip zinc coating layer at a surface of the substrate steel sheet; and alloying heat-treating the substrate steel sheet to form an alloying hot-dip coating layer, having a composition of (in weight %) 0.1 to 10% of Mn, 5 to 15% of Fe, and the remainder including Zn and other unavoidable impurities, at the surface of the substrate steel sheet.

According to the present invention, a hot-dip zinc coating layer or an alloying hot-dip coating layer of Zn—Fe—Mn is formed on a high-manganese steel sheet. Consequently, the present invention has the effect of providing a hot-dip coated steel sheet superior in corrosion resistance to a conventional hot-dip coated steel sheet while exhibiting high ductility and high strength.

BEST MODE FOR CARRYING OUT THE INVENTION

Hereinafter, the present invention will be described in detail.

First, a substrate steel sheet for a hot-dip coated steel sheet according to the present invention will be described.

As a substrate steel sheet according to the present invention, a hot rolled steel sheet or a cold rolled steel sheet may be used containing (in weight %) 0.1 to 1.5% of C, 5 to 35% of Mn, and the remainder including Fe and other unavoidable impurities (a first substrate steel sheet).

0.01 to 3% of Al may be further added to the first substrate steel sheet (a second substrate steel sheet).

Also, one or more elements selected from a group consisting of less than 3% of Si, less than 9% of Cr, less than 5% of Cu, less than 4% of Ni, less than 1% of Mo, less than 1% of Nb, less than 0.5% of V, and less than 0.04% of N may be further added to the first substrate steel sheet or the second substrate steel sheet (a third substrate steel sheet).

Also, one or more elements selected from a group consisting of 0.005 to 0.05% of Sn, 0.005 to 0.05% of Sb, 0.005 to 0.05% of As, and 0.005 to 0.05% of Te may be further added to the first substrate steel sheet, the second substrate steel sheet, or the third substrate steel sheet (a fourth substrate steel sheet).

Also, one or more elements selected from a group consisting of 0.0005 to 0.040% of B, 0.0005 to 0.1% of Zr, 0.0005 to 0.1% of Ti, 0.0005 to 0.040% of La, 0.0005 to 0.040% of Ce, and 0.0005 to 0.030% of Ca may be further added to the first substrate steel sheet, the second substrate steel sheet, the third substrate steel sheet, or the fourth substrate steel sheet (a fifth substrate steel sheet).

The reason to select elements for the substrate steel sheet and to restrict the content range of the elements will be described hereinafter in detail.

Carbon (C) is an element for stabilizing austenite phase. It is advantageous to increase the content of C. Preferably, more than 0.1% of C is added to accomplish the addition effect thereof.

When the content of C exceeds 1.5%, however, the stability of the austenite phase greatly increases with the result that the transition of deformation behavior occurs due to slip deformation, and therefore, the workability of the substrate steel sheet decreases.

Consequently, it is preferable to restrict the upper limit content of C to 1.5%.

Manganese (Mn) is an indispensable element for stabilizing austenite phase. In addition, Mn is an important element for acting as a Mn source for a coating layer during alloying heat treatment after the completion of a coating process.

When the content of Mn is less than 5%, the diffusion of Mn from the substrate steel sheet to the coating layer suddenly decreases during alloying heat treatment after the completion of a coating process. For this reason, it is preferable to add more than 5% of Mn.

When the content of Mn exceeds 35%, on the other hand, high-temperature oxidation rapidly progresses at the surface of a steel due to a large quantity of Mn during a reheating process for hot rolling the steel. As a result, the surface quality of final products is deteriorated. Furthermore, the excessive addition of Mn increases the manufacturing costs of the steel. For this reason, it is preferable to limit the content of Mn to less than 35%.

Generally, aluminum (Al) is added to deoxidize a steel. In the present invention, however, Al is added to improve the ductility of the steel.

Specifically, Al is an element for stabilizing ferrite phase. In addition, Al increases stacking fault energy at a slip plane of the steel to restrain the creation of ϵ-martensite phase and thus to improve the ductility of the steel.

Furthermore, Al restrains the creation of ϵ-martensite phase even when the content of Mn is small. Consequently, Al contributes greatly to the minimization of Mn content and the improvement of the workability of the steel.

When the content of Al is less than 0.01%, ϵ-martensite is created, whereby the strength of the steel increases; however, the ductility of the steel suddenly decreases. For this reason, it is preferable to add more than 0.01% of Al.

When the content of Al exceeds 3%, however, twin generation is restrained with the result that the ductility of the steel decreases. In addition, the castability of the steel decreases during continuous casting, and surface oxidation excessively occurs during hot rolling. As a result, the surface quality of the products deteriorates. For this reason, it is preferable to restrict the upper limit content of Al to 3.0%.

When silicon (Si) is excessively added, a silicon oxide layer is formed on the surface of a steel with the result that the hot-dip coatability of the steel decreases.

When an appropriate amount of Si is added to a steel containing a large amount of Mn, however, a thin Si oxide layer is formed at the surface of the steel with the result that oxidation of the steel is restrained in the air. Consequently, a thick Mn oxide layer is prevented from being formed on the surface of a cold rolled steel sheet after rolling. In addition, corrosion of the cold rolled steel sheet is prevented after annealing. Consequently, it is possible to maintain superior surface quality of the cold rolled steel sheet.

Furthermore, the creation of the thick Mn oxide layer is restrained during hot-dip coating, the hot-dip coating characteristics are greatly improved. Besides, the tensile strength and the elongation of a steel increase.

When the content of Si increases, however, Si oxide is formed at the surface of a steel sheet during hot rolling with the result that pickling efficiency decreases, and therefore, the surface quality of the hot-rolled steel sheet is deteriorated.

Also, Si is enriched at the surface of the steel sheet during high-temperature annealing in a continuous annealing process and a continuous hot-dip coating process. Consequently, wettability of molten zinc to the surface of the steel sheet decreases during hot-dip coating. As a result, the coatability of the steel sheet decreases. In addition, the excessive addition of Si greatly decreases the weldability of the steel sheet.

For this reason, the upper limit content of Si is limited to 3%.

Similarly to Si, chromium (Cr) is an element for forming a passive-state film in the air to restrain the corrosion of a steel. Specifically, Cr prevents decarburization of carbon from the steel during high-temperature hot rolling to restrain the creation of α'-martensite phase at the surface of a steel sheet, thereby improving the formability of the steel.

When the content of Cr, which is an element for stabilizing ferrite phase, increases, however, the creation of the α'-martensite phase is accelerated with the result that the ductility of the steel decreases. For this reason, the upper limit content of Cr is limited to 9.0%.

Copper (Cu) is an element added to increase the corrosion resistance and the strength of a steel. When the content of Cu exceeds 5%, red brittleness occurs with the result that the hot workability of the steel decreases. Consequently, it is preferable to limit the content of Cu to less than 5.0%.

Nickel (Ni) is an element for increasing the stability of austenite phase. When Ni is added, the creation of α'-martensite phase, which decreases the formability of the steel, is restrained.

Preferably, more than 0.1% of Ni is added to accomplish the addition effect thereof.

When excessive Ni is added, however, internal oxidation rapidly progresses along a grain boundary. As a result, cracks may be generated during hot rolling. Furthermore, the excessive addition of Ni increases the cost of production. Consequently, it is preferable to limit the upper limit content of Ni to 4.0%.

Molybdenum (Mo) is an element added to improve the secondary processing brittleness resistance and the coatability of a steel. When the content of Mo exceeds 1.0%, the improvement efficiency thereof decreases. Furthermore, the excessive addition of Mo is economically disadvantageous. Consequently, the content of Mo is limited to less than 1.0%.

Niobium (Nb) and vanadium (V) are elements added to increase the strength of a steel. When the content of Nb exceeds 1.0%, cracks are generated during hot working. When the content of V exceeds 0.5%, a compound having a low melting point is created with the result that the hot workability of the steel decreases. Consequently, it is preferable to limit the contents of Nb and V to less than 1.0% and less than 0.5%, respectively.

Nitrogen (N) cooperates with Al in austenite grain during a solidification process to precipitate micronitride. Consequently, twin generation is accelerated with the result that the strength and ductility of a steel sheet increase during the formation of the steel sheet. When the content of N exceeds 0.04%, however, the nitride is excessively precipitated with the result that the hot workability and elongation of the steel sheet decrease. Consequently, the content of N is limited to less than 0.040%.

Generally, phosphorus (P) and sulfur (S) are element unavoidably contained during the manufacture of a steel. Consequently, the contents of P and S are limited to less than 0.03%.

Especially, P is segregated to decrease the workability of the steel. S forms coarse manganese sulfide (MnS) with the result that cracks, such as flange cracks, are generated. In addition, S decreases the hole expandability of the steel sheet. Consequently, the contents of these elements are maximally restrained.

Boron (B) is an element existing at a columnar grain boundary in a solid-solution phase at a temperature of 1000° C. or more to restrain the creation and movement of vacancy and thus strengthen the columnar grain boundary.

When the content of B is less than 0.0005%, however, the addition effect thereof is insignificant. When the content of B exceeds 0.040%, on the other hand, a large amount of carbide and nitride is generated. The generated carbide and nitride act as nuclei for aluminum nitride precipitation with the result that the precipitation of coarse aluminum nitride is accelerated, and therefore, the grain boundary is embrittled.

Consequently, the content of B is preferably limited to be 0.0005 to 0.040%.

Titanium (Ti) and zirconium (Zr) are elements existing at a columnar grain boundary in a solid-solution phase to increase the melting point of a low-melting point compound having enriched Al and thus to prevent the formation of a liquid-phase film on grain boundary at a temperature of 1300° C. or less. Furthermore, these elements have a high affinity for N. Consequently, these elements form nitride and thus prevent coarse growth of aluminum nitride on grain boundary which is a cause of the embrittlement of the columnar grain boundary, to strengthen the columnar grain boundary.

When the respective contents of Ti and Zr are less than 0.005%, however, the addition effect thereof is insignificant. When the respective contents of Ti and Zr exceed 0.10%, on the other hand, the excessive amount of Ti and Zr is segregated into the grain boundary with the result that the grain boundary is embrittled. Consequently, the respective contents of Ti and Zr are limited to be 0.0005 to 0.10%.

Lanthanum (La) and cesium (Ce) are rare-earth elements, which act to create nuclei of a dendrite structure, at the time of solidifying molten steel, to micronize the size of the dendrite, thereby restraining the growth of a columnar structure and accelerating the creation of an equiaxed structure.

That is, La and Ce decrease the size and quantity of the columnar grain which causes the embrittlement of the grain boundary, and increase the quantity of the equiaxed grain exhibiting high-temperature ductility, thereby improving the hot workability of a cast structure. In addition, La and Ce form a compound together with P and S, which are segregated into the grain boundary to decrease the break strength of the grain boundary, thereby decreasing bad effects caused by P and S.

When the respective contents of La and Ce are less than 0.0005%, however, the addition effect thereof is insignificant. When the respective contents of La and Ce exceed 0.040%, on the other hand, the addition effect thereof is saturated. Consequently, it is preferable to limit the respective contents of La and Ce to be 0.0005 to 0.040%.

Calcium (Ca) forms a compound together with nonmetallic elements, such as $Al_2O_3$, MnO, and MnS, in molten steel to spheroidize the nonmetallic elements, thereby increasing the break strength of the columnar grain boundary. In addition, Ca alleviates the susceptibility of generating flange cracks in a steel sheet and increases the hole expandability of the steel sheet.

When the content of Ca is less than 0.0005%, however, the addition effect thereof is insignificant. When the content of Ca exceeds 0.030%, on the other hand, the addition effect thereof is saturated. Consequently, it is preferable to limit the content of Ca to be 0.0005 to 0.030%.

Antimony (Sb), tin (Sn), arsenic (As), and tellunium (Te) themselves do not form an oxidized film at high temperature. However, these elements restrain the diffusion of highly oxidized elements, such as Al, Si, and Mn, contained in a substrate steel sheet to the surface of the substrate steel sheet and thus the formation of oxide at the surface of the substrate steel sheet, thereby effectively preventing uncoating and improving the uniformity of coating.

When the respective contents of Sb, Sn, As, and Te are less than 0.005%, however, the addition effect thereof is insignificant. When the respective contents of Sb, Sn, As, and Te exceed 0.05%, on the other hand, the addition effect thereof is saturated. Consequently, it is preferable to limit the respective contents of Sb, Sn, As, and Te to be 0.005 to 0.05%.

Hereinafter, a method of manufacturing a substrate steel sheet according to the present invention will be described in detail.

A high-manganese steel (high-manganese steel slab) composed as described above is heated to a temperature of 1050 to 1300° C. to perform homogenization. After that, the steel is hot rolled in a finishing hot rolling condition of 850 to 950° C. Subsequently, the steel is wound at a temperature of 650° C. or less to manufacture a hot rolled steel sheet, which is a substrate steel sheet. According to circumstances, the hot rolled steel sheet may be cold rolled and annealed to manufacture a cold rolled steel sheet, which is a substrate steel sheet.

The reason to limit the upper limit of the heating temperature to be 1300° C. is that the melting point of a low-melting compound of a columnar grain boundary rises to approximately 1300° C. by the addition of a small quality of an alloying element to strengthen the columnar grain boundary. Consequently, when the steel slab is heated to more than 1300° C., a liquid film is created at the columnar grain boundary of the steel slab, whereby cracks are generated at the steel slab during hot rolling.

Also, the reason to limit the lower limit of the heating temperature to be 1050° C. is that, when the heating temperature is low, the temperature gap between the heating temperature and the finishing rolling temperature is narrow, and therefore, it is not possible to sufficiently roll the steel slab to a predetermined thickness.

That is, the normal finishing rolling temperature is approximately 900° C. in a hot rolling process. Consequently, when the finishing rolling temperature is lowered, rolling load increases with the result that the rolling machine is badly affected, and, in addition, the interior quality of the steel sheet is deteriorated.

When the hot winding temperature is too high, a thickly oxidized film is formed at the surface of the hot rolled steel sheet, and oxidation occurs in the hot rolled steel sheet, whereby, an oxidation layer is not easily removed during a pickling process.

Consequently, it is preferable to limit the winding temperature of the hot rolled steel sheet to be less than 700° C.

In order to remove oxidized scale formed at the surface of the hot rolled steel sheet, a pickling process is performed using an HCl solution. According to circumstances, after the pickling process is performed, a cold rolling process is performed to adjust the shape and thickness of the steel sheet.

In the case that the hot rolled steel sheet is cold rolled, the cold rolled steel sheet is continuously annealed at a temperature of 600° C. or more.

The reason to anneal the cold rolled steel sheet at a temperature of 600° C. or more is that, when the annealing temperature is too low, it is difficult to secure sufficient workability, and the transformation to austenite does not sufficiently occur to the extent that austenite phase can be maintained at low temperature.

The substrate steel sheet according to the present invention is an austenite steel in which phase transformation does not occur. Consequently, when the substrate steel sheet is heated to a temperature exceeding the recrystallization temperature, it is possible to secure sufficient workability. For this reason, the substrate steel sheet is annealed in normal annealing conditions.

Hereinafter, a hot-dip coating process according to the present invention will be described.

The steel sheet, which has been hot rolled and then pickled to remove its surface oxide as described above, or the steel sheet, which has been cold rolled and then annealed at a recrystallization temperature of 600° C. or more as described above, as a substrate steel sheet, is hot-dip coated to create a hot-dip coating layer.

Specifically, the hot rolled steel sheet or the cold rolled steel sheet manufactured as described above is deposited in a hot-dip zinc coating bath such that a hot-dip zinc coating layer is uniformly formed at the surface of the steel sheet, whereby a high-manganese hot-dip coated steel sheet exhibiting high corrosion resistance is manufactured.

As the hot-dip zinc coating bath, a normal hot-dip zinc coating bath basically containing Zn and Al may be used.

After the hot rolled steel sheet or the cold rolled steel sheet manufactured as described above is deposited in the hot-dip zinc coating bath such that the hot-dip zinc coating layer is uniformly formed at the surface of the steel sheet, the steel sheet is alloying heat-treated at a temperature of 440 to 580° C. to form an alloying hot-dip coating layer, whereby a high-manganese hot-dip coated steel sheet exhibiting high corrosion resistance is manufactured.

The alloying hot-dip coating layer is created by the diffusion of Zn, Fe, and other elements contained in the substrate steel sheet and the reaction with Zn contained in the hot-dip zinc coating layer during alloying heat treatment.

The alloying hot-dip coating layer has a composition of (in weight %) 0.1 to 10% of Mn, 5 to 15% of Fe, and the remainder including Fe and other unavoidable impurities.

The other unavoidable impurities may be small quantities of elements introduced into the substrate steel sheet during a coating process.

When the content of Mn contained in the alloying hot-dip coating layer according to the present invention is less than 0.1%, it is difficult to expect the improvement of the corrosion resistance. When the content of Mn exceeds 10%, on the other hand, the mechanical toughness of the coating layer decreases. Consequently, it is preferable to limit the content of Mn to be 0.1 to 10%.

Also, when the content of Fe is less than 5%, a pure zinc layer remains at the surface of the coating layer with the result that the toughness of the coating layer is deteriorated. When the content of Fe exceeds 15%, on the other hand, the powdering of the coating layer may easily occur. Consequently, it is preferable to limit the content of Fe to be 5 to 15%.

Hereinafter, the present invention will be described in more detail with reference to examples.

EXAMPLES

A plurality of steel slabs composed as indicated in Table 1 below were manufactured.

In Table 1, No. 1 steel to No. 11 steel are inventive steels having element content ranges according to the present invention, whereas No. 12 steel to No. 15 steel are comparative steels not having element content ranges according to the present invention.

The steel slabs were heated to a temperature of 1200° C. such that the steel slabs were hot rolled. The steel slabs were hot finishing rolled. The steel slabs were wound at a temperature of 620° C., and were cooled by air. Oxides were removed from surfaces of the respective steel sheets using an HCl solution. The steel sheets were cold rolled at a reduction ratio of 70%. As a result, cold rolled steel sheets were manufactured.

Subsequently, the cold rolled steel sheets were annealed in an atmosphere of $N_2$-10% $H_2$ of 620 to 880° C. for 90 seconds, and were deposited in a bath of Zn-0.013% Al maintained at a temperature of 460° C. As a result, hot-dip zinc coating layers were formed on the surfaces of the respective steel sheets.

Observations were made of whether the hot-dip zinc coating layers formed as described above had coating defects. The results revealed that the hot-dip zinc coating layers formed at the steel sheet surfaces of Inventive steels 1 to 11 had no coating defects.

On the other hand, the hot-dip zinc coating layer formed at the steel sheet surface of Comparative steel 12, containing more than 3% of Si, had coating defects, such as uncoating and blister. Also, the hot-dip zinc coating layer formed at the steel sheet surface of Comparative steel 13, containing less than 2% of Mn and more than 1% of Si, had uncoated regions.

Alloying heat treatment was performed on the steel sheets having the hot-dip zinc coating layers formed thereon as described above at a temperature of 540° C. to form alloying hot-dip coating layers of Zn—Fe—Mn having compositions as indicated in Table 2 below. The characteristics, coatability, and corrosion resistance of the alloying hot-dip coating layers were measured. The results were indicated in Table 2 below.

In Table 2 below, the coatability was evaluated.

Excellent: No uncoated region

Poor: Spot-type uncoated regions having a diameter of less than 0.5 mm on the coating layer Very poor: uncoated regions having a diameter of more than 0.5 mm on the coating layer Also, in Table 2 below, salt spray tests (SST) were carried out using a 5% NaCl solution, and the results were evaluated as follows:

⊚: Less than 3 mm of film blister width

◯: 3 to 5 mm of film blister width

Δ: more than 5 to 7 mm of film blister width

X: more than 7 mm of film blister width

Also, in Table 2 below, cyclic corrosion tests (CCT) were carried out using a 5% NaCl solution, and the results were evaluated as follows:

⊚: Less than 2 mm of film blister width

◯: 3 to 4 mm of film blister width

Δ: more than 4 to 6 mm of film blister width
X: more than 6 mm of film blister width

TABLE 1

| Composition | | Chemical composition(weight %) | | | | | | | | | | |
|---|---|---|---|---|---|---|---|---|---|---|---|---|
| Steel type | | C | Mn | Al | Si | B | Mo | Cu | Ni | Nb | V | N | Others |
| Inventive steel | 1 | 0.44 | 5.11 | 1.5 | 0.1 | 0.005 | — | — | — | — | — | 0.005 | — |
| | 2 | 0.44 | 15.18 | 0.1 | 0.3 | 0.005 | — | 0.3 | — | — | — | 0.006 | — |
| | 3 | 1.18 | 15.67 | 2.2 | 1.5 | — | 0.4 | — | | — | 0.3 | 0.007 | 0.036 La |
| | 4 | 0.08 | 19.1 | — | — | — | — | — | — | — | — | — | 6.2Cr |
| | 5 | 0.43 | 18.38 | — | 0.3 | — | — | — | — | 0.02 | — | 0.005 | 0.03 Ce |
| | 6 | 0.43 | 18.37 | 2.7 | — | — | 0.7 | — | — | 0.03 | 0.01 | 0.02 | 0.02Sb |
| | 7 | 0.59 | 18.38 | 2.4 | — | 0.007 | — | 1.5 | 0.6 | — | — | 0.11 | 0.03 Ca |
| | 8 | 0.59 | 18.38 | 1.3 | — | 0.043 | — | 1.8 | 2.1 | — | — | 0.03 | 0.005 Zr |
| | 9 | 0.59 | 15.35 | 1.1 | — | — | — | — | — | — | — | 0.005 | 0.032 Zr |
| | 10 | 0.21 | 30.23 | 1.5 | — | — | — | — | — | — | — | 0.006 | — |
| | 11 | 0.12 | 35.0 | 2.1 | 0.05 | — | — | — | — | — | — | 0.006 | — |
| Comparative steel | 12 | 0.62 | 18.38 | 1.1 | 3.5 | — | — | 1.8 | 2.1 | — | — | 0.005 | — |
| | 13 | 0.1 | 1.6 | 0.04 | 2.5 | — | — | 0.01 | 0.02 | 0.03 | — | 0.006 | — |
| | 14 | 0.1 | 1.6 | 0.04 | 0.1 | — | — | — | — | — | — | 0.005 | — |
| | 15 | 0.002 | 0.085 | 0.12 | 0.06 | 0.001 | 0.1 | — | — | — | — | 0.005 | — |

TABLE 2

| Coating characteristics | | Coating | | Coating layer composition (weight %) | | Corrosion resistance after coating | |
|---|---|---|---|---|---|---|---|
| Steel type | | weight | Coatability | Mn | Fe | SST | CCT |
| Inventive steel | 1 | 45 | Excellent | 0.9 | 8.1 | ○ | ○ |
| | 2 | 48 | Excellent | 1.9 | 9.1 | ◎ | ◎ |
| | 3 | 52 | Excellent | 3.2 | 8.8 | ◎ | ◎ |
| | 4 | 47 | Excellent | 3.7 | 10.1 | ◎ | ◎ |
| | 5 | 45 | Excellent | 2.2 | 8.1 | ◎ | ○ |
| | 6 | 46 | Excellent | 3.4 | 11.1 | ◎ | ◎ |
| | 7 | 51 | Excellent | 2.5 | 8.9 | ◎ | ◎ |
| | 8 | 48 | Excellent | 3.2 | 12.1 | ◎ | ◎ |
| | 9 | 49 | Excellent | 2.1 | 9.9 | ◎ | ◎ |
| | 10 | 45 | Excellent | 4.5 | 12 | ◎ | ◎ |
| | 11 | 52 | Excellent | 7.1 | 11 | ◎ | ◎ |
| Comparative steel | 12 | 49 | Poor | 2.1 | 8.1 | X | X |
| | 13 | 48 | Very poor | 0.07 | 8.9 | X | X |
| | 14 | 48 | Excellent | 0.04 | 10 | Δ | Δ |
| | 15 | 46 | Excellent | 0.01 | 9.7 | Δ | Δ |

As can be seen from Table 2 above, Inventive steels 1 to 11 exhibited excellent corrosion resistance characteristics as compared to Comparative steels 12 to 15.

As apparent from the above description, a hot-dip zinc coating layer or an alloying hot-dip coating layer of Zn—Fe—Mn is formed on a high-manganese steel sheet. Consequently, the present invention provides a hot-dip coated steel sheet superior in corrosion resistance to a conventional hot-dip coated steel sheet while exhibiting high ductility and high strength.

The invention claimed is:

1. A high-manganese hot-dip coated steel sheet exhibiting superior corrosion resistance, comprising:
    a substrate steel sheet having a composition of (in weight %) 0.1 to 1.5% of C, 15.18% to 35% of Mn, 0.01 to 3% of Al, and the remainder including Fe and other unavoidable impurities, wherein the substrate steel sheet further contains one or more elements selected from a group consisting of less than 3% but more than 0% of Si, less than 9% but more than 0% of Cr, less than 5% but more than 0% of Cu, less than 4% but more than 0% of Ni, less than 1% but more than 0% of Mo, less than 1% but more than 0% of Nb, less than 0.5% but more than 0% of V, and less than 0.04% but more than 0% of N, wherein the substrate steel sheet has austenite as a main phase; and
    an alloying hot-dip coating layer formed on the substrate steel sheet, the alloying hot-dip coating layer having a composition of (in weight %) 0.1 to 10% of Mn, 5 to 15% of Fe, and the remainder including Zn and other unavoidable impurities,
    wherein the alloying hot-dip coating layer consists of a single layer structure that consists of δ phase, and wherein the alloying hot-dip coating layer is formed during an alloy heat-treatment after deposition of a hot-dip zinc coating layer, whereby the Mn content of the substrate steel sheet acts as a Mn source for the coating layer during the alloying heat-treatment.

2. The steel sheet according to claim 1, wherein the substrate steel sheet further contains one or more elements selected from a group consisting of 0.005 to 0.05% of Sn, 0.005 to 0.05% of Sb, 0.005 to 0.05% of As, and 0.005 to 0.05% of Te.

3. The steel sheet according to claim 1, wherein the substrate steel sheet further contains one or more elements selected from a group consisting of 0.0005 to 0.040% of B, 0.0005 to 0.1% of Zr, 0.0005 to 0.1% of Ti, 0.0005 to 0.040% of La, 0.0005 to 0.040% of Ce, and 0.0005 to 0.030% of Ca.

4. The steel sheet according to claim 2, wherein the substrate steel sheet further contains one or more elements selected from a group consisting of 0.0005 to 0.040% of B, 0.0005 to 0.1% of Zr, 0.0005 to 0.1% of Ti, 0.0005 to 0.040% of La, 0.0005 to 0.040% of Ce, and 0.0005 to 0.030% of Ca.

* * * * *